Sept. 17, 1929.　　　J. W. WYLAND　　　1,728,462
EGG TESTER
Filed May 19, 1926
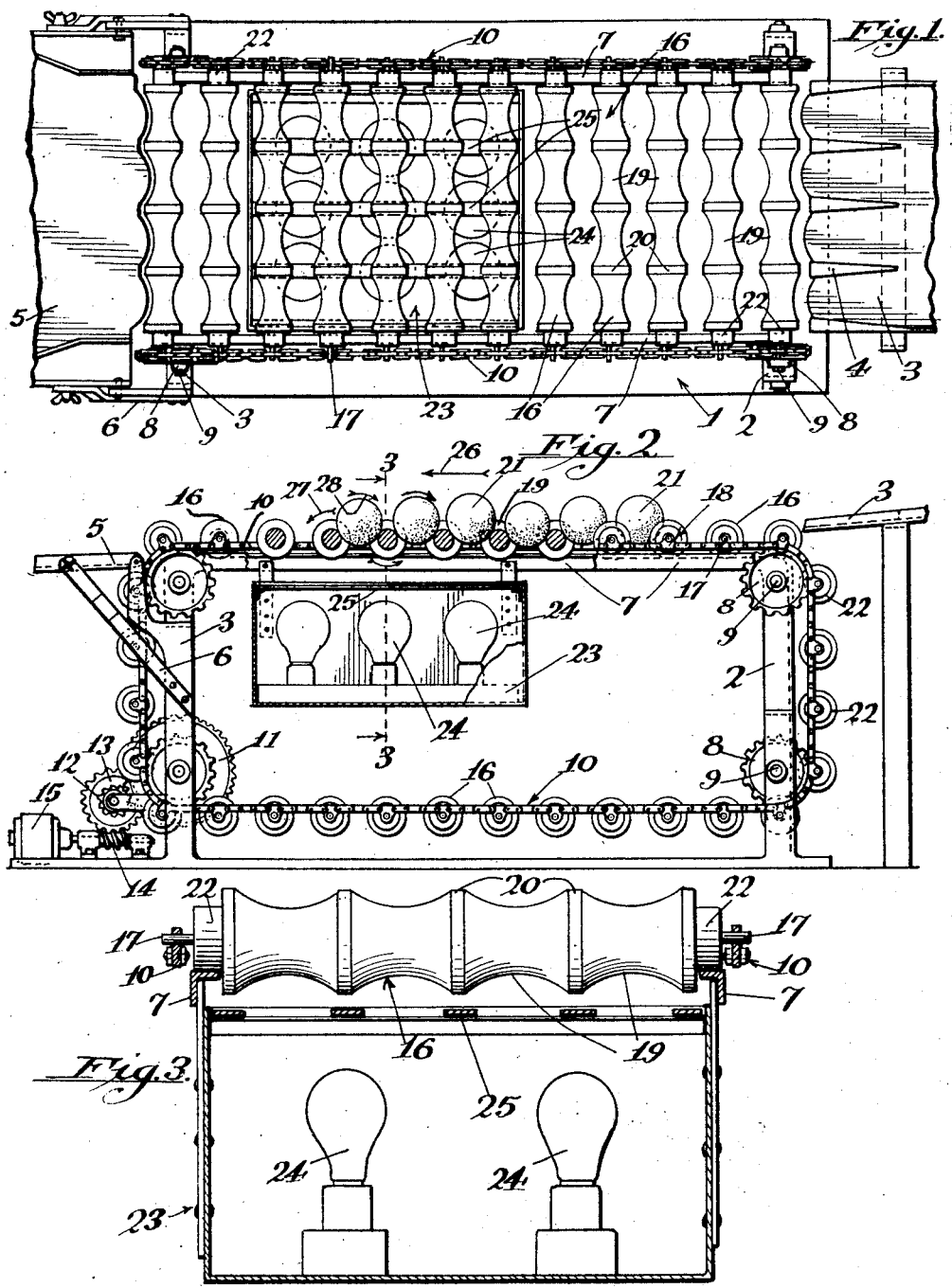

Patented Sept. 17, 1929

1,728,462

UNITED STATES PATENT OFFICE

JOHN W. WYLAND, OF SAN GABRIEL, CALIFORNIA

EGG TESTER

Application filed May 19, 1926. Serial No. 110,072.

My invention is an egg tester designed for use in candling eggs.

An object of my invention is to employ an endless conveyor for eggs, the conveyor conveying the eggs over suitable lamps whereby the light from the lamps will shine through the egg, giving it a translucent appearance, thereby allowing testing of the eggs by the so-called candling method.

A further object of my invention is to rotate the eggs while they are being passed over the source of light, thus simulating the manipulation of eggs by hand candling.

An object of my invention is the development of a method of testing eggs in which the eggs are continuously moved or carried in a forward direction and at the same time are rotated without any jolting or pressing movement of one egg on another, and in such movement are subject to light for the purpose of candling.

In my egg testing machine I utilize traveling conveyors, these being preferably side chains with cross rollers journaled thereon, the chains being suitably driven and carrying the rollers. The rollers are preferably shaped to support a plurality of eggs lengthwise of each pair of rollers, the rollers being spaced sufficiently apart so that when the rollers with the eggs thereon pass over the source of light such light will shine through the eggs, giving a translucent effect by which the tester may grade the eggs. The rollers are also constructed to run on a track so that they will rotate, thereby giving the eggs a rotary movement.

My invention will be more readily understood from the following description and drawings, in which;

Figure 1 is a plan view of my egg testing machine;

Fig. 2 is a side elevation with parts of the conveyor in vertical section and showing the lamp base for shining light through the eggs;

Fig. 3 is an enlarged transverse section on the line 3—3 of Fig. 2, in the direction of the arrows.

The stationary part of my machine is constructed substantially as follows, having a base 1 with suitable end structures 2 and 3, the forward end having an infeeding table 3' with guideways 4 to feed the eggs on the endless conveyor hereunder described. An outfeeding table 5 is supported adjustably on a bracket 6. Longitudinal rails 7 shown as angle bars extend lengthwise of the frame at the upper part.

Sprocket wheels 8 are mounted on suitable shafts 9 and journaled preferably in the end structures 2 and 3. The chains 10 follow substantially a rectangular path, the chains on opposite sides manifestly moving in unison. A driving gear 11 is keyed to one of the shafts and meshes with a pinion 12, this latter being driven by a worm gear 13 meshing with a worm 14 rotated by an electric motor 15. Thus a continuous motion is conveyed to the endless chains.

A series of rollers 16 have cylindrical ends 17 journaled in journal links 18 of the chains. These rollers are preferably provided with a series of concave surfaces 19 with ridges 20 therebetween. The complementary concave curves suitably hold the eggs indicated by the numeral 21. A circular section 22 on the end of each roller is designed to rest and roll on the track 7 in the upper part of the machine.

A lamp box 23 is suspended from the upper part of the machine or suitably housed therein and has a series of electric lamps 24. As the box is closed in except for the top, light passes out the top of the box. A series of bars 25 run lengthwise of the box underneath the ridges 20 and is intended to block out the light so that all the light projected upwardly must pass through the eggs.

The manner of utilizing my egg tester is substantially as follows:

It will be understood that by suitable control of the electric motor the endless conveyors may be driven at any suitable transverse speed in the direction of the arrow 26 of Fig. 2. The eggs are fed from the table 3 on to the rolls in a suitable manner and on account of these rolls engaging the rails 7 the rolls are given a rotation in the direction indicated by the arrows 27. As the eggs rest on two rollers the eggs are given a reverse rotation in the direction indicated by the arrow 28. Thus while the eggs are passing over the lamp box they are being continuously and slowly rotated, thus exposing the complete circumference of the egg at its small diameter to the light, thereby turning the egg in a manner simulating the manipulation of such eggs in hand candling. A certain amount of light as above mentioned is cut out at the ridges 20 and thus at the extreme ends of the eggs, but this need not be sufficient to prevent the full length of the egg being exposed to the light.

It is manifest that a skilled egg candler may grade the eggs as they are passed over the conveyor by removing the imperfect eggs or those of different grades. It will also be noted that my machine provides a plurality of passages for eggs and if desired the grader may shift the eggs from one passage to another so that they may be removed by an attendant at the discharge end and placed in suitable containers in accordance with the grades and the particular line of passage such eggs follow.

It will be seen that I have developed a method of testing eggs by continuously carrying the eggs in a forward direction and rotating them at the same time, the conveying and rotating being carried on without the eggs contacting or engaging one with the other, and during this movement of translation and rotation of the eggs they are subjected to light for the candling operation.

A feature of my invention is that the upper surface or the longitudinal rails 7 is smooth and the cylindrical portion of the rollers 16 rolls thereon. Therefore, if in any circumstance the device became jammed the rollers instead of rotating and breaking the eggs will cease rotation and slide on the tracks 7. Moreover, in operation sometimes it is desirable for the operator to hold certain of the eggs stationary for inspection and this may be readily done by engaging two or more of the rollers and preventing the rotation, allowing them to slide. My invention distinguishes from egg testers in which the rollers are positively driven by a stationary rack type of track and pinion gears on the different rollers.

It will be manifest also that any suitable type of conveyor for the eggs might be satisfactory, carrying the eggs over a source of light and having suitable means to rotate the eggs. Hence it is obvious that my testing machine may be considerably modified in general construction and in specific details to suit different types of installations. Such changes however, would be within the spirit of my invention as set forth in the description, drawings and claims.

Having described my invention, what I claim is:

1. An egg testing machine comprising in combination an endless type of conveyor formed of rollers adapted to support eggs between two adjacent rollers, smooth surface tracks supporting the upper run of said conveyor, the ends of the rollers being cylindrical and operating on said tracks, and a source of light positioned to shine through the eggs.

2. An egg testing machine comprising in combination a suitable frame having a pair of longitudinally extending smooth surface tracks, an endless conveyor having its upper run passing adjacent said tracks, said conveyor having a pair of endless chains, a plurality of rollers the opposite ends of each roller being journaled in the chains, each of the rollers having a cylindrical surface adjacent the opposite ends running on the said tracks, the rollers having surfaces to support eggs between two adjacent rollers, and a source of light positioned below the upper run of the conveyor to shine through the eggs.

3. An egg testing machine comprising in combination a suitable frame structure having sprocket wheels with means to drive a pair of said wheels on a common shaft, a pair of endless chains positioned parallel to each other and operating over the sprocket wheels and driven by one pair of said wheels, a plurality of rollers having pin-like ends journaled in the opposite chains each of the rollers having a cylindrical surface adjacent its opposite ends, a pair of smooth surface tracks extending longitudinally and positioned to support the said cylindrical surface of the rollers, the rollers having surfaces to support and rotate eggs between each two contiguous rollers, and a source of light positioned to shine through the eggs.

In testimony whereof I have signed my name to this specification.

JNO. W. WYLAND.